Aug. 18, 1959    G. E. HIRT ET AL    2,900,150
EJECTION SEAT CATAPULT
Filed Jan. 22, 1957    2 Sheets-Sheet 2

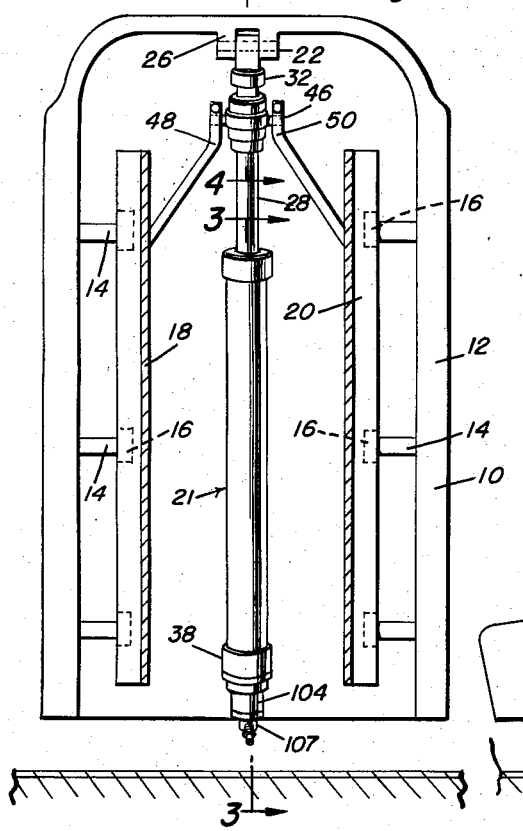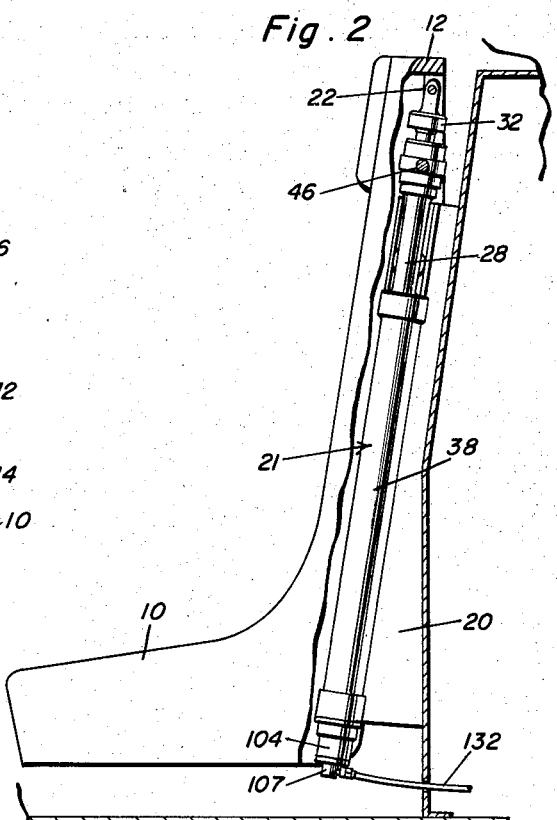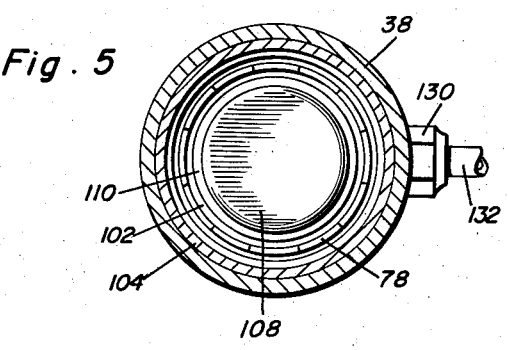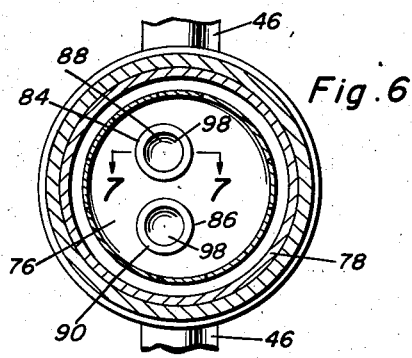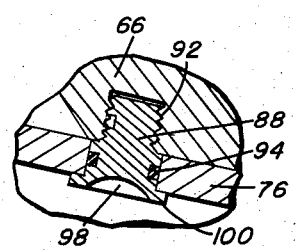
Gerald E. Hirt
Eugene A. Martino
INVENTORS.

Gerald E. Hirt
Eugene A. Martino
INVENTORS.

BY

United States Patent Office 2,900,150
Patented Aug. 18, 1959

2,900,150

EJECTION SEAT CATAPULT

Gerald E. Hirt, Madison, and Eugene A. Martino, East Haven, Conn., assignors to Talco Engineering Co., Inc., Hamden, Conn., a corporation of Connecticut Application January 22, 1957, Serial No. 635,266

26 Claims. (Cl. 244—122)

This invention relates to an improved ejection seat catapult and is a continuation in part of the application of Gerald E. Hirt and Eugene A. Martino, Serial No. 586,796, Filed May 23, 1956 for Ejection Seat Catapult.

The primary object of the present invention is to provide a new device for ejecting seats from dirigible vehicles such as high speed airplanes and more particularly to provide a novel cartridge actuated rocket propelled catapult ejection seat for subsonic or supersonic aircraft.

As is well known ejection seats for aircraft are often used in emergencies for positioning an occupant clear of the aircraft. However, when such ejection is made at high speeds, the deceleration forces generated are humanly intolerable. It is therefore one of the advantages of the invention that the effects of such forces in high speed ejection of personnel is substantially reduced.

In the construction of modern aircraft vehicles which operate at high speeds, considerably larger control surfaces, especially those for the rudder are necessary to have sufficient lateral control when the aircraft is flying in rarefied atmosphere. Therefore, the present invention provides means for enabling ejected personnel to clear the high tail structures of presentday aircraft.

Another object of the present invention is to provide a combined cartridge actuated rocket propelled ejection seat for an aircraft, which is of a size and configuration to reduce the weight and size of installation thus providing added safety at decreased cost and decreased deadweight for the aircraft vehicle.

Another object of the invention is to provide means for lockingly supporting and holding the seat in the aircraft until the cartridge actuated device has been fired.

An additional object of the invention is to provide a novel arrangement of a cartridge actuated rocket propelled ejection seat which includes the concept of pivotally securing a rocket to a seat with the rocket being provided with a canted jet or exhaust outlet so as to properly direct the seat and the personnel secured thereto in a desired path while eliminating the possibility of tumbling and other undesired movements of the ejected seat and personnel which might cause accelerations which are too great for the body to withstand to be applied on the ejected personnel.

These together with the various ancillary objects and features of the invention which will become apparent as the following description proceeds, are attained by this improved catapult ejection seat, a preferred embodiment of which has been illustrated in the accompanying drawings, by way of example only, wherein:

Figure 1 is a rear elevational view of a catapult ejection seat exemplifying one embodiment of the invention;

Figure 2 is a sectional detail view of the installation of a catapult ejection seat constructed in accordance with the concepts of the invention on an aircraft with the catapult ejection seat being shown mostly in elevation;

Figure 5 is an enlarged sectional detail view as taken along the plane of line 5—5 in Figure 3 illustrating in particular the construction of the tynes providing part of the lock utilized in the invention;

Figure 6 is a sectional detail view as taken along the line 6—6 in Figure 3 illustrating the means communicating the gases from the cartridge when fired to the rocket propellant; and Figure 7 is a sectional detail view as taken along the plane of line 7—7 in Figure 6 illustrating the construction of one of the fracturable plugs employed in the invention.

Figures 3, 4:
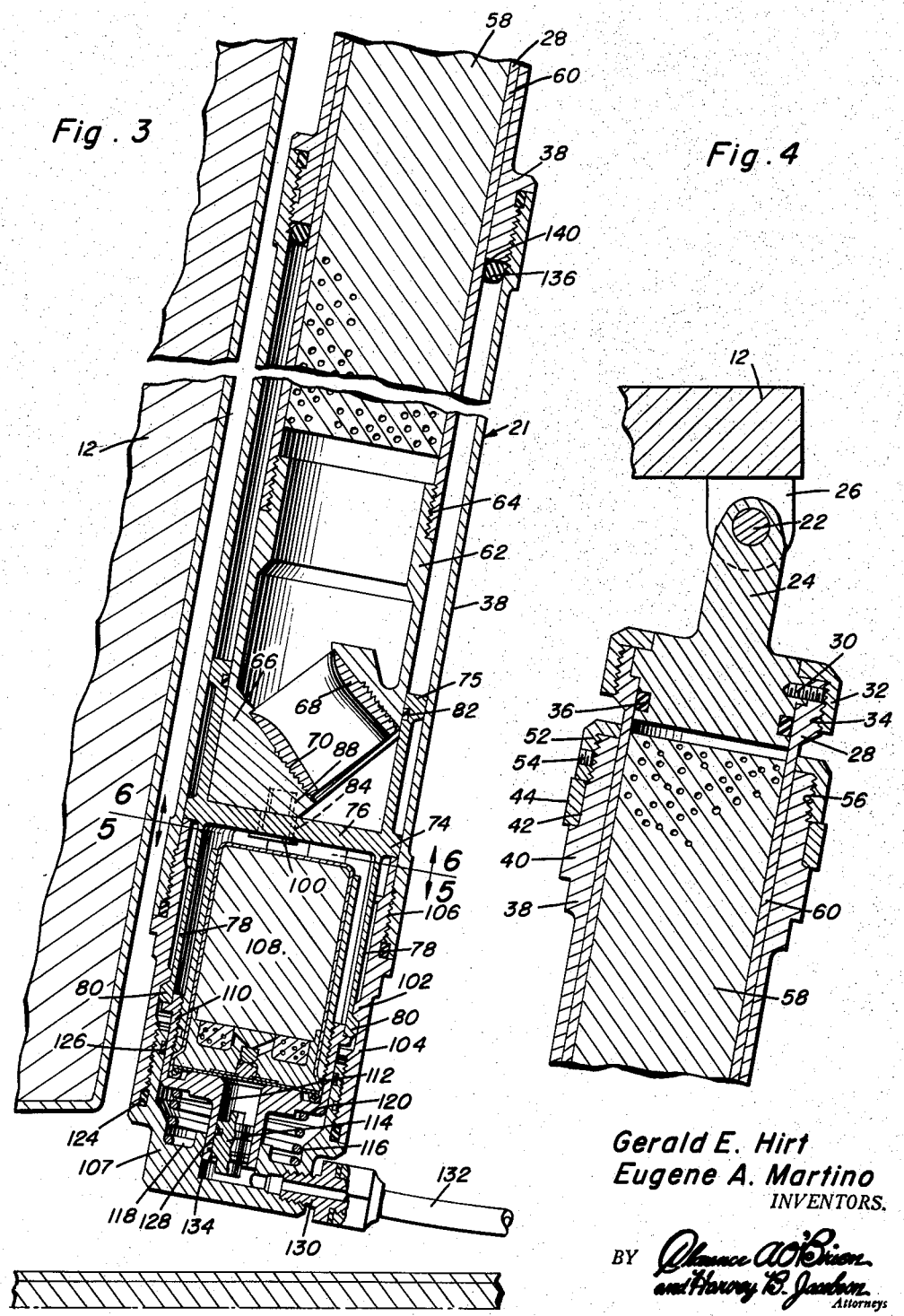
Figure 3 is an enlarged sectional detail view as taken along the plane of line 3—3 in Figure 1 illustrating in particular the construction of the inner and outer tubes and locking means connecting the inner tube with the outer tube while further illustrating the construction of the cartridge actuating means.
Figure 4 is a sectional detail view on an enlarged scale taken on the plane of line 4—4 in Figure 1 illustrating the means utilized for pivotally connecting the inner tube to the seat.

In the accompanying drawings there is seat 10 which includes a back frame 12 which may be of any suitable construction and which may carry by means of spacers 14 a plurality of slide blocks 16 engageable within spaced tracks 18 and 20 secured to the dirigible vehicle such as a high speed aircraft. The slide blocks 16 are adapted to slide in the preferably channel shaped tracks 18 and 20.

The ejection seat catapult 21 is located behind seat 10 and has an upper cap 24 pivoted to brackets 26 of frame 12 by pivot pin 22. The cap 24 is lockingly held to an inner tube 28 by means of a setscrew 30 and a locking ring 32 which overlies the setscrew and which is threadedly secured on the threaded end 34 of the tube 28. An O-ring seal 36 is provided between the cap 24 and the tube 28. Concentrically disposed about the inner tube 28 is an outer tube 38 which is provided with a thickened portion 40 and a circumferential groove 42 in which a ring 44 is retained. Trunnions 46 are fixed to ring 44 and are engageable within yoke arms 48 and 50 secured to the tracks 18 and 20. A locking cap 52 which forms one wall of groove 42 is threaded on the end of tube 38 and held in place by a lock screw 54.

The upper portion of the tube 28 is filled with a suitable rocket propellant 58. The inner tube 28 which consists of an upper section 60 and a lower section 62 threadedly secured to each other as at 64 is provided with a canted jet assembly including a canted mounting seat 66 for a venturi tube 68. Tube 68 constitutes an exhaust orifice and is threaded as at 70 to the seat 66.

Concentrically disposed about the section 62 of the inner tube is a locking piston 74 having a plate 76 to which a plurality of tynes 78, of any suitable number are attached. The tynes are provided with thickened locking end portions 80.

The locking piston 74 is provided with a seal 82 with the inner tube section 62 and is provided with a plurality of apertures therethrough as at 84 and 86 in which breakable plugs 88 and 90 are positioned. The plugs 88 and 90 are of similar construction and are threaded as at 92 into the seat 66 of the inner tube. A suitable O-ring packing 94 is provided between the plate 76 and the plugs and it is noted that the head of each plug is concaved as at 98 so that gases may press against it to aid in shearing the flanges 100 during the early stages of operation of the device.

The tynes 79 are adapted to engage an internal ring like projection or lock 102 integrally formed on outer casing section 104 which is threaded as at 106 to the outer tube section 38'. Mounted within the confines of the tynes 78 and held in place by a base 107 threadedly secured to the outer casing section 104 is a cartridge 108. The cartridge 108 is threadedly secured in the confines of an unlocked piston 110 which constitutes a charge retaining means and which is provided with bore 112 therethrough in which the firing pin 114 moves. A spring 116 engages the surface 118 within a recess in the base 107 and also engages the surface 120 of the unlocked piston 110. Suitable O-ring seals 124 and 126 are provided as required as are seals 128 for the firing pin. Threadedly secured to the base 107 is a nipple 130 to which a compressed air hose 132 is attached. Of course, any suitable means may be utilized for actuating the firing pin 114 in lieu of compressed air or gas, it being noted that electrical, mechanical, pneumatic, or hydraulic means may be readily utilized for firing the cartridge 108.

The operation of the rocket catapult is initiated when gas under pressure enters through the tube 132 from another unit and acts upon the firing pin 114 shearing the shear pin 134 and freeing firing pin 114 to move forward to strike the primer of the cartridge 108 and thereby initiating combustion of the propellant charge in the cartridge. The gases resulting from this combustion first cause the unlocked piston 110 to move against and compress the spring 116 releasing the tynes 78 from engagement with the lock 102. The locking piston 74 and the rocket motor assembly including the inner tube made of sections 62 and 60 are then ejected from the outer tube by the actions of the gases from the cartridge 108. As the rocket motor housing and locking piston 74 move up the catapult formed by tube 38, shoulder 75 on piston 74 strikes the bottom edges of the packing 136 which lies against the edge 140 of the stationary outer tube 38. This stops the locking piston 74 and assures that the flanges of the plugs 84 and 86 are sheared off permitting the rocket motor assembly to continue its travel while also permitting the gases from the cartridge charge to pass through the holes 84 and 86 in the plate 76 after the plug has been pulled through which then enter the rocket nozzle 68 and ignite the propellant 58. Although dealing with exceedingly small time increments, the structure enabling the rocket device to be initially moved after which the hot gases from the initial charge ignites the rocket grain, forms a delay means in the operation of the rocket catapult. The ignited propellant then exerts a continuing rocket thrust on the ejection seat with the gases passing out of the nozzle 68 driving the rocket against the seat and causing the seat to be propelled upward and forwardly thus giving added time for clearance and greater height so that the ejected personnel and seat can clear tail surfaces. Further, since the seat will be projected forwardly, the atmosphere will not decelerate the seat and personnel at a rate greater than the human body can stand.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A device for ejecting a seat from a dirigible vehicle comprising in combination with a seat, a pair of telescoping tubes, one of said tubes secured to said seat, means separably locking said tubes together, means including a cartridge for releasing said locking means and for initially propelling said one of said tubes and seat, and a rocket propellant ignited by the gases of said cartridge and located in said one of said tubes for further propelling said seat both before and after said tubes have separated from each other.

2. A device for ejecting a seat from a dirigible vehicle comprising in combination with a seat, a pair of telescoping tubes, a first one of said tubes secured to said seat, a locking piston connected to both tubes and separately locking said tubes together, means having an initial charge for initially propelling said piston and said first tube, a stop connected with the second tube against which said piston strikes to thereby separate said piston from said first tube, and a rocket propellant in said second tube for further propelling said seat after said tubes have separated from each other.

3. A device for ejecting a seat from a dirigible vehicle comprising in combination with a seat, a first and a second extensibly connected tube, said first tube secured at one end to said seat, means separably locking said tubes together, ballistic means for releasing said locking means and for initially propelling said first tube and seat, a rocket propellant in said first tubes for further propelling said seat after separation of said tubes, impact responsive means responsive to deceleration of said ballistic means for igniting said rocket propellant, said first tube having a nozzle through which rocket propellant gases can escape, said nozzle extending angularly away from said seat whereby said first tube will be urged against said seat upon firing of said rocket propellant.

4. An ejection device for catapulting a seat from a vehicle and further propelling said seat comprising the combination with a seat of a cartridge, cartridge actuating means for catapulting the seat, means to instantaneously oppose the movement of said seat, and rocket propellant means responsive to the reaction force generated by the instantaneous opposing of said seat for continuing to apply propulsive force to said seat while said tubes are being separated and after said tubes are separated.

5. A device for ejecting a seat from a dirigible vehicle comprising the combination with a seat of a pair of telescoping tubes, one of said tubes secured to said seat, cartridge actuating means separably locking said tubes together for initially propelling said seat, a rocket propellant in said one of said tubes for further propelling said seat both during and after said initially propelling said seat, said cartridge actuating means serving to ignite said rocket propellant, said one of said tubes having a nozzle through which rocket propellant gases can escape, said nozzle extending angularly away from said seat whereby said one of said tubes urge said seat both forwardly and upwardly with continuing force during and after separation of said seat from the vehicle.

6. A device for ejecting a seat from a dirigible vehicle comprising in combination with a seat, a pair of telescoping tubes, one of said tubes secured to said seat, cartridge actuating means separably locking said tubes together for initially propelling said seat, a rocket propellant in said one of said tubes for further propelling said seat, said cartridge actuating means including a locking piston detachably secured to one of said tubes, a plurality of tynes on said locking piston, a lock on the other of said tubes, and a spring pressed unlock piston engaging said tynes to hold said tynes against said lock, said unlock piston being urged to release said tynes on firing of said cartridge actuating means.

7. A device for ejecting a seat from a dirigible vehicle comprising in combination with a seat, a pair of telescoping tubes, one of said tubes secured to said seat, cartridge actuating means separably locking said tubes together for initially catapulting, ejecting and propelling said seat, a rocket propellant in said one of said tubes for further propelling said seat, said cartridge actuating means including a locking piston detachably secured to one of said tubes, a plurality of tynes on said locking piston, a lock on the other of said tubes, and a spring pressed unlock piston engaging said tynes to hold said tynes against said lock, said unlock piston being urged to release said tynes on firing of an abutment in the path of travel of said locking piston, and means responsive to impact of said locking piston against said abutment, said cartridge actuating means to ignite said rocket propellant.

8. A device for ejecting a seat from a dirigible vehicle comprising in combination with a seat, a pair of telescoping tubes, one of said tubes secured to said seat, cartridge actuating means separably locking said tubes together for initially catapulting, ejecting and propelling said seat, a rocket propellant in said one of said tubes for further propelling said seat, said cartridge actuating means including a locking piston detachably secured to one of said tubes, a plurality of tynes on said locking piston, a lock on the other of said tubes, a spring pressed unlock piston engaging said tynes to hold said tynes against said lock, said unlock piston being urged to release said tynes on firing of said cartridge actuating means, said cartridge actuating means serving to ignite said rocket propellant, said one of said tubes having a nozzle having a discharge axis passing forward and upward through the center of gravity of the seat and its occupant to provide a force in a direction to retain the seat erect.

9. A device for ejecting a seat from a dirigible vehicle comprising the combination with a stationary seat frame and a seat slidably mounted in the frame inner and outer extensibly connected tubes, the inner tube secured to said seat, cartridge actuating means separably locking said tubes together for initially catapulting, ejecting and propelling said seat, and a rocket propellant located in said inner tube and ignted after said carriage actuating means for further propelling said seat.

10. A device for ejecting a seat from a high speed aircraft comprising the combination with a stationary seat frame and a seat slidably mounted in the frame of; inner and outer telescoping tubes, the inner tube connected to said seat, cartridge actuating means separably locking said tubes together for initially catapulating, ejecting and propelling said seat, a rocket propellant in said inner tube or application of propulsive force to said seat after operation of said cartridge actuating means and both during and after separation of said tubes, said cartridge actuating means serving to ignite said rocket propellant, said inner tube having a nozzle through which rocket propellant gases can escape, said nozzle extending angularly away from said seat whereby said pivotally connected inner tube will be urged forwardly and upwardly toward said seat upon firing of said rocket propellant, said cartridge actuating means including a locking piston detachably secured to said inner tube, a plurality of tynes on said locking piston, a lock on said outer tube, and a spring pressed unlock piston engaging said tynes to hold said tynes against said lock, said unlock piston urged to release said tynes on firing of said cartridge actuating means.

11. The device of claim 2 wherein there are impact responsive means connected with said piston for exposing the burning gases of said initial charge to said rocket propellant thereby igniting said rocket propellant.

12. The device of claim 11 wherein there is a nozzle carried by said second tube and having a discharge axis providing a line of thrust through the combined center of gravity of said seat and its occupant to thereby reduce the possibility of seat tumble.

13. An aircraft seat ejection device comprising a first tube, a second tube extensibly connected with said first tube and a chamber between parts of said tubes, means locking said tubes together, a combustible charge in said chamber, means for igniting said charge and releasing said tubes locking means and thereby providing a first stage propulsion of said first tube with respect to said second tube, rocket propellant in said first tube to provide a second stage propulsive force, impact openable means isolating said propellant from said chamber, and means for applying an impact force to said isolating means while said tubes are separating thereby exposing said rocket propellant to the burning charge gases in said chamber and igniting said propellant for the continued application of thrust to said first tube after separation of said tubes.

14. An aircraft seat ejection device comprising a first tube, a second tube extensibly connected with said first tube and a chamber between parts of said tubes, means locking said tubes together, a combustible charge in said chamber, means for igniting said charge and releasing said tubes locking means and thereby providing a first stage propulsion of said first tube with respect to said second tube, rocket propellant in said first tube to provide a second stage propulsive force, impact openable means isolating said propellant from said chamber, and means for applying an impact force to said isolating means while said tubes are separating thereby exposing said rocket propellant to the burning charge gases in said chamber and igniting said propellant for the continued application of thrust to said first tube after separation of said tubes, said tubes locking means including a piston located in said second tube and connected with said first tube, said isolating means including a shear pin connecting said piston to said first tube.

15. An aircraft seat ejection device comprising a first tube, a second tube extensibly connected with said first tube and a chamber between parts of said tubes, means locking said tubes together, a combustible charge in said chamber, means for igniting said charge and releasing said tubes locking means and thereby providing a first stage propulsion of said first tube with respect to said second tube, rocket propellant in said first tube to provide a second stage propulsive force, impact openable means isolating said propellant from said chamber, and means for applying an impact force to said isolating means while said tubes are separating thereby exposing said rocket propellant to the burning charge gases in said chamber and igniting said propellant for the continued application of thrust to said first tube after separation of said tubes, said tubes locking means including a piston located in said second tube and connected with said first tube, said isolating means including a shear pin connecting said piston to said first tube, said impact force applying means comprising a stop in said second tube and engaged by said piston to thereby break said shear pin which communicates said chamber with said propellant to ignite said propellant after which said first tubes and propellant constitute a rocket whose thrust is at least partially developed while said tubes are connected and which continues after said tubes are separated.

16. The aircraft seat ejection device of claim 15 wherein the seat is in an aircraft, said rocket having a discharge nozzle providing a line of thrust angled forward and upward with respect to the direction of aircraft travel so that there are both forward and upward thrust components with the resultant thrust passing through the center of gravity of the seat and its occupant to retain the seat erect while it is being ejected.

17. In an aircraft, a seat, a support for said seat, a first tube, means fastening said first tube to said seat, a second tube extensibly connected with said first tube, a charge retaining chamber between said tubes, a charge in said chamber, and means for igniting the charge in said chamber to provide initial movement of said first tube with respect to said second tube, the improvement comprising means including rocket propellant in said first tube to apply thrust in addition to momentum to said first tube and which is continued after said tubes have separated, and a discharge nozzle connected with said first tube and providing a canted thrust axis for said first tube.

18. In an aircraft, a seat, a support for said seat, a first tube, means fastening said first tube to said seat, a second tube extensibly connected with said first tube, a charge retaining chamber between said tubes, a charge in said chamber, and means for igniting the charge in said chamber to provide initial movement of said first tube with respect to said second tube, the improvement comprising means including rocket propellant in said first tube to apply thrust in addition to momentum to said first tube and which is continued after said tubes have separated, and means rendered operative before said tubes separate to ignite said rocket propellant and thereby generate at least some of the rocket thrust before said first tube separates from said second tube.

19. In an aircraft, a seat, a support for said seat, a first tube, means fastening said first tube to said seat, a second tube extensibly connected with said first tube, a charge retaining chamber between said tubes and means for igniting the charge in said chamber to provide initial movement of said first tube with respect to said second tube, the improvement comprising means including rocket propellant in said first tube and which is continued after said tubes have separated, means rendered operative before said tubes separate to ignite said rocket propellant and thereby generate at least some of the rocket thrust before said first tube separates from said second tube, said rocket propellant igniting means comprising a locking piston that is separably attached to said second tubes and which isolates said propellant from said chamber, means responsive to said charge igniting means for releasing said piston from said second tube, a frangible member in said piston connecting said piston to said second tube and providing communication between said chamber and said propellant when said frangible member is broken, and a stop in the path of travel of said piston to oppose the motion of said first tube and break said frangible member.

20. In an aircraft, a seat, a support for said seat, a first tube, means fastening said first tube to said seat, a second tube extensibly connected with said first tube, a charge retaining chamber between said tubes and means for igniting the charge in said chamber to provide initial movement of said first tube with respect to said second tube, the improvement comprising means including rocket propellant in said first tube to apply thrust in addition to momentum to said first tube and which is continued after said tubes have separated, impact responsive means for registering said propellant with said chamber before said tubes separate thereby igniting said rocket propellant and developing rocket thrust prior to as well as after separation of said first tube from said second tube.

21. In an aircraft, a seat, a support for said seat, a first tube, means fastening said first tube to said seat, a second tube extensibly connected with said first tube, a charge retaining chamber between said tubes and means for igniting the charge in said chamber to provide initial movement of said first tube with respect to said second tube, the improvement comprising means including rocket propellant in said first tube to apply thrust in addition to momentum to said first tube and which is continued after said tubes have separated, impact responsive means for registering said propellant with said chamber before said tubes separate thereby igniting said rocket propellant and developing rocket thrust prior to as well as after separation of said first tube from said second tube, a discharge nozzle carried by said second tube and having a discharge axis whose extension substantially passes through the center of gravity of the seat and its occupant.

22. In an aircraft, a seat, a support for said seat, a first tube, means fastening said first tube to said seat, a second tube extensibly connected with said first tube, a charge retaining chamber between said tubes and means for igniting the charge in said chamber to provide initial movement of said first tube with respect to said second tube, the improvement comprising means including rocket propellant in said first tube to apply thrust in addition to momentum to said first tube and which is continued after said tubes have separated, impact responsive means for registering said propellant with said chamber before said tubes separate thereby igniting said rocket propellant and developing rocket thrust prior to as well as after separation of said first tube from said second tube, a discharge nozzle carried by said second tube and having a discharge axis whose extension substantially passes through the center of gravity of the seat and its occupant with the line of rocket thrust tilted forward and upward with respect to the direction of flight for preventing the seat from tumbling when ejected into the airstream.

23. In an aircraft seat, an ejection device having a tube fixed to the aircraft, the improvement comprising a rocket extensibly connected with said tube and secured to said seat, an initial charge in said tube, means for firing said charge and thereby propelling said rocket in a direction to separate said rocket from said tube, and delay means rendered operative before said rocket separates from said tube for igniting the propellant of said rocket thereby developing rocket thrust on the seat prior to during and after said rocket separates from said tube.

24. The improvement in the ejection device of claim 23 wherein said rocket has means for directing the rocket thrust with forward and upward components on the seat to prevent the seat from tumbling when ejected into the airstream.

25. Ejection apparatus adapted for use with an aircraft seat, said apparatus comprising a rocket device, support means for said rocket device, means adapted for securing said rocket device to a seat, an initial charge retaining means in said support means, a charge in said initial charge retaining means to initially propel and ignite said rocket device, and a discharge nozzle connected with said rocket device and providing a canted thrust axis for said rocket device.

26. An ejection apparatus adapted for use with an aircraft seat, said apparatus comprising a rocket device having a longitudinal axis, support means for said rocket device, means adapted for connecting said rocket device to a seat, an initial charge retaining means in said support means, an initial charge in said retaining means to initially propel and ignite said rocket device, and said rocket device having means providing a canted thrust axis with respect to said longitudinal axis.

References Cited in the file of this patent

UNITED STATES PATENTS

| 2,459,948 | Lobelle | Jan. 25, 1949 |
| 2,527,020 | Martin | Oct. 24, 1950 |
| 2,552,181 | Kleinhans | May 8, 1951 |

FOREIGN PATENTS

| 502,560 | France | Feb. 24, 1920 |

OTHER REFERENCES

"Aviation Week," magazine, November 12, 1956, pages 71, 72, 74, 77.